(12) United States Patent
Gilbert

(10) Patent No.: US 6,170,594 B1
(45) Date of Patent: Jan. 9, 2001

(54) METHOD AND APPARATUS FOR REDUCING VEHICLE ROLLOVER

(76) Inventor: Micky G. Gilbert, 17932 W. 59th Ave., Golden, CO (US) 80403

(*) Notice: Under 35 U.S.C. 154(b), the term of this patent shall be extended for 0 days.

(21) Appl. No.: 09/323,862

(22) Filed: Jun. 1, 1999

(51) Int. Cl.[7] ............ B60R 21/13; B60B 39/08; B60B 39/10
(52) U.S. Cl. ............ 180/282; 280/755; 291/1; 291/3; 291/23
(58) Field of Search ............ 180/282; 280/755; 291/1, 2, 3, 23, 24; 701/45

(56) References Cited

U.S. PATENT DOCUMENTS

| | | | |
|---|---|---|---|
| 3,336,064 | 8/1967 | Dzaack | 291/1 |
| 4,377,210 * | 3/1983 | Monte | 180/282 |
| 4,771,822 | 9/1988 | Barbosa | 165/41 |
| 5,350,035 * | 9/1994 | Bodier et al. | 291/1 |
| 5,887,895 * | 3/1999 | Easter | 280/762 |

* cited by examiner

Primary Examiner—Peter C. English
(74) Attorney, Agent, or Firm—Kyle W. Rost

(57) ABSTRACT

A sensor detects force or other indications of an impending rollover of a motorized land vehicle. Upon detection of a threshold force value, the sensor actuates an applicator that delivers traction reducing fluid to the contact patch between at least one of the vehicle tires and the ground. The vehicle is enabled to dissipate the rollover inducing force by sliding laterally in preference to rolling over.

15 Claims, 3 Drawing Sheets

METHOD AND APPARATUS FOR REDUCING VEHICLE ROLLOVER

TECHNICAL FIELD

The invention generally relates to land vehicles. More specifically, the invention relates to wheeled vehicles having a special function device that protects against overturn. In another aspect, the invention generally relates to motor vehicles and to a device or method for promoting the safety of the vehicle, responsive to tilt or overturn forces. In another aspect, the invention relates to electronic systems for predicting rollover and activating corrective measures.

BACKGROUND ART

This invention addresses the problem of accidental overturn or rollover of a four wheeled vehicle, such as an automobile or truck. A common cause of such accidents is execution of a steering maneuver involving a sharp turn or swerve, causing the vehicle to tilt. If the lateral force causing the tilt is excessive, the vehicle's body lean can cause the vehicle to roll over, i.e., at least fall onto its side and perhaps continue through further stages of lateral rolling. This type of accident is extreme in its seriousness because the driver has lost all means of controlling the vehicle and has no possible recovery. Accidents of this type can be especially a danger in vehicles with high center of gravity, relative to their wheel track.

The stability of a vehicle is a function of its design, and many experts use the formula T/2H to define a stability ratio, where T=vehicle track and H=vehicle center of gravity height. As is evident from this formula, the stability factor for a vehicle of given track width is highly influenced by height dimension. Trucks tend to be tall relative to wheel track. However, the group of vehicles that presently appears most subject to rollover danger is the sport utility vehicle (SUV), which tends to be a passenger car built on a tall, truck-like chassis, often with four-wheel drive. These vehicles often serve as family cars and are driven by all skill levels of drivers, many of whom lack awareness of this special danger and tend to drive the SUV like an ordinary sedan.

The stability ratio represents the amount of side force, measured in gravity force (g-force) applied at the vehicle's center of gravity, necessary to overturn a rigid body with a given track width and center of gravity height. For example, if a solid car model weighted 3000 pounds and had a track width of 50 inches and a center of gravity height of 24 inches, its stability ratio would be 50/(2×24)=1.04. The amount of force needed to overturn the car model can be determined by multiplying vehicle weight by stability ratio. Thus, 3,120 pounds of force applied to the side at the level of the center of gravity will overturn the model on flat ground. Such a result is theoretical only, as it assumes a perfectly rigid vehicle and force applied in only one direction.

Actual cars operating on roads are subject to many other variables, including suspension systems, tire characteristics, and steering inputs. The geometry of a relatively unstable SUV may result in a stability ratio of 1.04, but such a vehicle may roll over on smooth pavement at less than 0.8 lateral g-force. This result is enabled, in part, by flexible tires and suspension systems, which on all vehicles tend to lower the force necessary for rollover below that predicted by T/2H.

The automotive industry has developed measures to improve safety during rollover accidents and in some instances, to assist in preventing them. These measures may employ a computer or processor that anticipates the rollover, based upon data constantly gathered during vehicle operation. For example, the computer may receive information about vehicle attitude, speed, and lateral acceleration, or any other data suited to any specific choice of calculation formula. From gathered data, the processor can predict when rollover danger is high. By automatically adjusting the vehicle suspension system or tire rotation rate, the processor may prevent a rollover that the driver does not anticipate or have skill to correct. Unfortunately, an imminent rollover can be brought about so suddenly, i.e, by an emergency maneuver, that preventative measures of this sort are essentially ineffective. More commonly, the processor improves safety during the rollover by activating safety equipment or seeking to prevent fire. U.S. Pat. No. 5,835,873 to Darby et al., U.S. Pat. No. 5,797,111 to Halasz et al., U.S. Pat. No. 5,610,575 to Gioutsos, U.S. Pat. No. 4,531,607 to Browne, and U.S. Pat. No. 4,377,210 to Monte show prior art of this nature. In each, a computer, sensor, or similar system determines the status of the vehicle. In response to a detected condition, the computer or sensor causes a helpful preparatory action, such as shutting off the fuel pump, tightening a seat belt, spraying lubricant on the windshield, or deploying an air bag.

In areas of automotive technology unrelated to rollover prevention, the automotive industry has developed methods and equipment for improving tire traction under slippery conditions. These methods involve spraying traction increasing materials on the tires or roadway. Examples include U.S. Pat. No. 5,582,411 to Frost, U.S. Pat. No. 5,118,142 to Bish, U.S. Pat. No. 1,959,240 to Josky, U.S. Pat. No. 3,554,370 to Wrede and U.S. Pat. No. 3,256,920 to Byers. These patents show that a vehicle may carry its own supply of sand or other traction-increasing material. Such materials may be sprayed before the vehicle by air pressure in order to assist traction, such as for stopping. A computer may control the application system, operating in response to detected wheel slippage. With the development of antilock braking systems (ABS), the ABS braking computer is well-suited to activate a sand spray unit. This technology potentially can be adapted to preventing rollovers, despite the fact that its application thus far has been directed to the art of stopping and offers little or no assistance to the art of preventing rollovers.

There are a few situations in which a liquid is applied to car tires or brakes for a special purpose, although unrelated to preventing rollovers. U.S. Pat. No. 3,779,324 to Kreske, Jr. shows a manually activated, pressurized, on-board system for spraying detergent onto tires of a drag race car as part of a washing system, to assist the driver in spinning the tires against the road surface just before a drag race to clean the tread. U.S. Pat. No. 4,771,822 to Barbosa teaches spraying tires and brakes in order to cool them. U.S. Pat. No. 3,336,064 to Dzaack teaches spraying tires with a solution of anti-freeze for softening ice to increase tire traction on the ice.

The trend in automotive traction technology as illustrated, above, clearly has been to prevent loss of traction. This approach to designing safety systems seeks to give the driver positive control at all times. Even those systems that oppose rollover do so by attempting to maintain the vehicle in controlled condition. At such time as the physics of rollover dictates that control inevitably will be lost, because the tires leave the ground, the existing systems surrender preventative measures and fall back to accommodating the rollover by activating injury protection devices.

In almost every conceivable situation, it would be desirable to prevent rollover in preference to accepting and accommodating rollover. The potential for extensive property damage, serious injury, and even death in a rollover appears to be so great that extreme prevention measures cannot be ignored. Thus, it would be desirable to prevent rollover by inducing a slide.

To achieve the foregoing and other objects and in accordance with the purpose of the present invention, as embodied and broadly described herein, the method of preventing rollover of this invention may comprise the following.

DISCLOSURE OF INVENTION

Against the described background, it is therefore a general object of the invention to provide an improved method of rollover prevention by inducing a temporary reduction of traction in preference to allowing rollover.

A related object is to provide a method of rollover prevention in which an automated device monitors vehicle condition and determines when a threshold is met at which possibility of a rollover is significant. The automated device then activates a fluid discharge onto the vehicle's tires, reducing tire traction and allowing the vehicle to side slip or skid in preference to a lateral rollover.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, the danger of vehicle rollover is reduced under conditions when a lateral force is applied to a longitudinally moving land vehicle of the type having at least four ground engaging wheels arranged in at least two laterally spaced apart pairs, one pair in a longitudinally forward position and the other pair in a longitudinally rearward position. This reduction is achieved by providing a fluid capable of reducing ground traction of a ground engaging wheel when the fluid is applied to an interface of the wheel and the underlying ground. A reservoir on the vehicle contains a volume of this fluid. When in active mode, an applicator that is selectively activatable between active and inactive modes delivers the fluid from the reservoir to the proximity of the interface of at least one of the ground engaging wheels of the vehicle and the underlying ground. An automated means detects a preselected amount of lateral force applied to the vehicle and places the applicator in active mode in response to detection of the preselected lateral force. In this way, the vehicle is enabled to dissipate the lateral force by sliding laterally.

The accompanying drawings, which are incorporated in and form a part of the specification illustrate preferred embodiments of the present invention, and together with the description, serve to explain the principles of the invention. In the drawings:

BEST MODE FOR CARRYING OUT THE INVENTION

Figure 1:
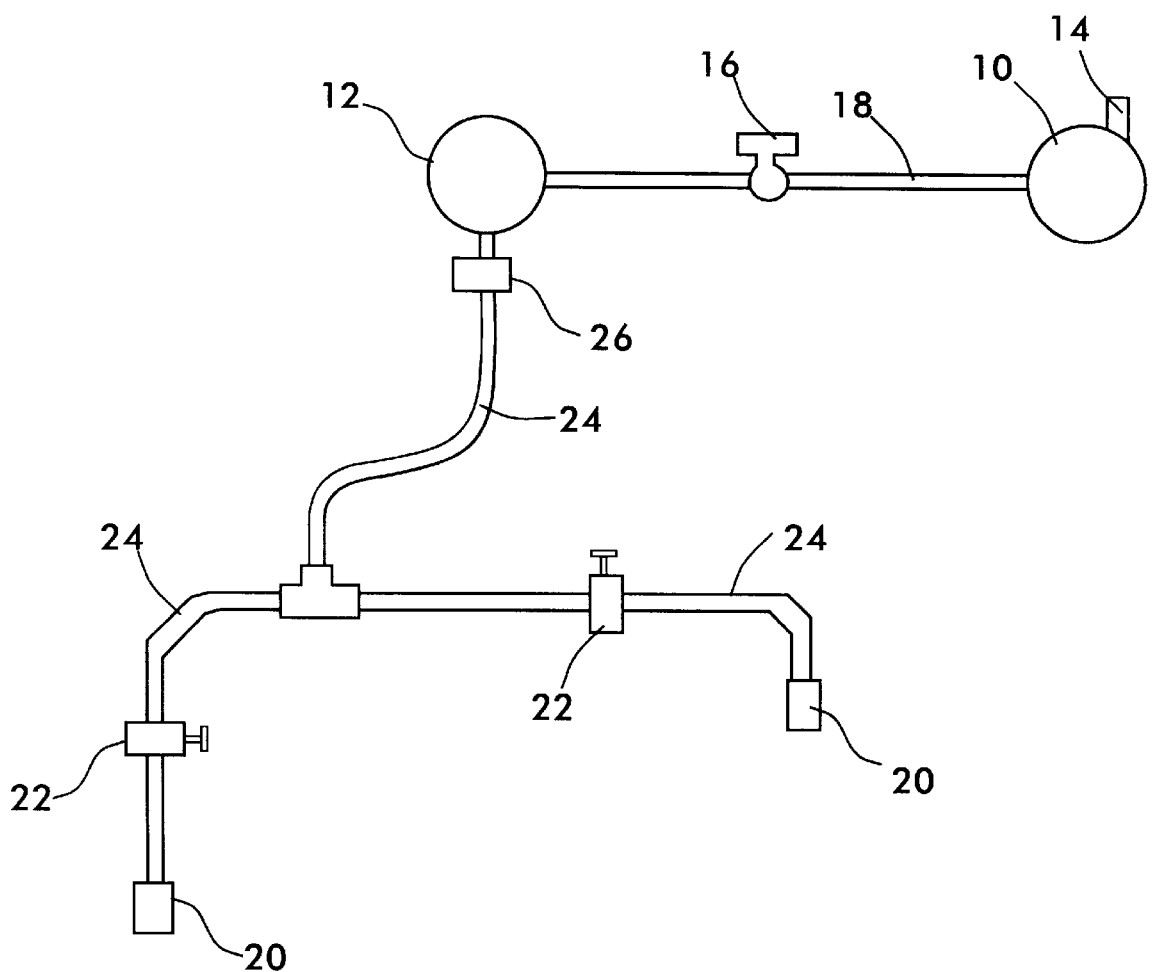
FIG. 1 is a schematic diagram showing a fluid storage system and applicator system.

This invention addresses the danger of vehicle overturn under conditions of high lateral force or lateral acceleration and provides a method and apparatus for maintaining a motor vehicle in upright position by a temporary reduction in traction, thereby inducing or permitting a lateral skid or slide as a preferable means of dissipating overturn forces. The invention may be applied to a conventionally configured land vehicle of the type having a front end and rear end, in which the front end is equipped with a first pair of steerable, ground engaging tires; and the rear end is equipped with a second pair of ground engaging tires. The invention provides a method for preventing rollover and a system consisting of a vehicle condition sensor and processor, a traction reducing fluid, and an applicator responsive to the processor for applying the fluid to the interface between a vehicle's tire and the underlying road or ground, commonly called the contact patch. The primary utility of this invention is as applied to motor vehicles operating on a smooth, paved surface under fair weather conditions. Under such seemingly good operating conditions, many vehicles suffer rollover as a result of their tires having too much traction with respect to a steering induced side force that is sufficient to cause rollover.

The skidding performance of an automobile of mass (m) following a curve or radius (r) at a speed (v), can be analyzed in terms of centripetal force, $mv^2/r$, which is the net force toward the center of the circle defining the radius of turn. The centripetal force provides the necessary centripetal acceleration toward the center of the circle. On a level road, friction between the automobile's tires and the roadway must be sufficient to provide the centripetal force. If frictional force is too small, there will result too little centripetal acceleration and the automobile will skid. However, if friction is adequate while speed is relatively too great or radius of turn is relatively too small, the automobile will overturn. Under other, more complex road conditions, it remains possible with knowledge of the automobile's design and surrounding environment to calculate, anticipate, or predict when danger of an overturn is significant.

As is evident from consideration of the centripetal force formula, one of the significant factors that influences overturn is tire traction. A tire can be assigned a friction capacity that is generally indicative of its maximum frictional performance with the roadway. One significant application of tire traction is in steering maneuvers, where the interface of the tire with the roadway must generate resistance to forward momentum and build side forces. The amount of resulting side force depends in part upon the friction characteristics of the tire/roadway interface. On a typical road surface with a high coefficient of friction, at the level of the vehicle's center of gravity, a 3,000 lb. vehicle might be exposed to side forces of 0.8 g or 2,400 lbs. On an icy road, the same vehicle might begin to slide sideways with a side force of only 300 lbs. In the latter instance, the force needed to overcome friction between the tire and roadway surface is only 0.1 g. At the high end of the traction spectrum, a formula-type racing car may be able to sustain tremendous side forces, approaching 4.0 G, partly because of very high traction tires that retain adhesion to the track surface even in very high speed turns.

The amount of side force that a vehicle can sustain without rollover will be called the vehicle capacity. As shown in the illustrations, above, the vehicle capacity can vary with conditions.

A tire can be viewed as reaching its limit in a turning maneuver when it is no longer capable of generating additional side forces. Some engineers refer to this as the "saturation" point of the tire. This invention addresses the problem of vehicles whose characteristics permit vehicle rollover before the tires reach their limit in a dynamic steering maneuver, or when tire capacity exceeds vehicle capacity. This invention seeks to prevent the vehicle from failing, i.e. to prevent rolling over, before the tires "fail", i.e., before the tires slide out.

A tire reaches its limit as a result of various factors. Steer angle refers to the driver's input to the steering wheel. If a driver turns the steering wheel by a quarter of a revolution, the steer angle is 90°. Steer rate is the quickness of turning the steering wheel. If the driver inputs a 90° steer in 0.2 seconds, the steer rate is 450° per second. A driver's steer angle does not generate an equal degree of movement in the road wheels. The angular change of the road wheel depends upon the steering ratio. In a vehicle having a steering ratio of 20:1, for every 20° of steering wheel rotation, the road wheels will turn 1°.

Slip angle has multiple definitions. It may be defined with respect to a vehicle as the angle between the vehicle heading and the direction of path of travel of the vehicle's center of gravity. This term also may be defined with respect to tire performance during a turning maneuver. Each tire has a slip angle defined between the heading of the road wheel and the direction of tire travel.

A contact patch is the portion of the tire in contact with the road. As the steering wheel and road wheels turn, the tire contact path is initially pointed in the original direction of travel. As the tire sidewall twists, the contact patch continues to grip the road because of friction between the rubber and road surface. At low lateral accelerations, the direction of the contact patch is the same as the direction of the tire/vehicle travel path because the contact patch is gripping the road instead of sliding.

As the tire rotates through the steering maneuver, the contact patch is urged to come into better alignment with the wheel because of the twisting force in the sidewall. However, the change in the direction of the contact patch lags the change in direction of the road wheel, thus creating the slip angle. In a normal cornering maneuver, the slip angle is reduced to zero when the contact patch comes into alignment with the road wheel at the end of the maneuver.

As long as the contact patch has the same heading as the tire/vehicle travel path, the tire is gripping the road and assists the vehicle in completing a turn. However, when the tire begins to slide out, it is close to its limit and the contact patch is less efficient in turning the vehicle. As the tire begins to slide, the vehicle will oversteer or understeer, depending upon whether the sliding tire is on the back or front end of the vehicle.

The design and construction of a tire's sidewall will control the tire's slip angle. A tire with high cornering stiffness—having a stiff sidewall and/or high air pressure—requires a significant lateral or cornering force to generate a given unit of slip angle. The stiffer the sidewall, the more efficiently the tire responds to steer commands. A relatively stiff sidewall causes the contact patch to respond more quickly to changes in the road wheel's direction of turning. A tire of relatively lower cornering stiffness requires less force to produce the same slip angle. Correspondingly, the contact patch responds less quickly to changes in the road wheel's direction of turning.

Figure 3:
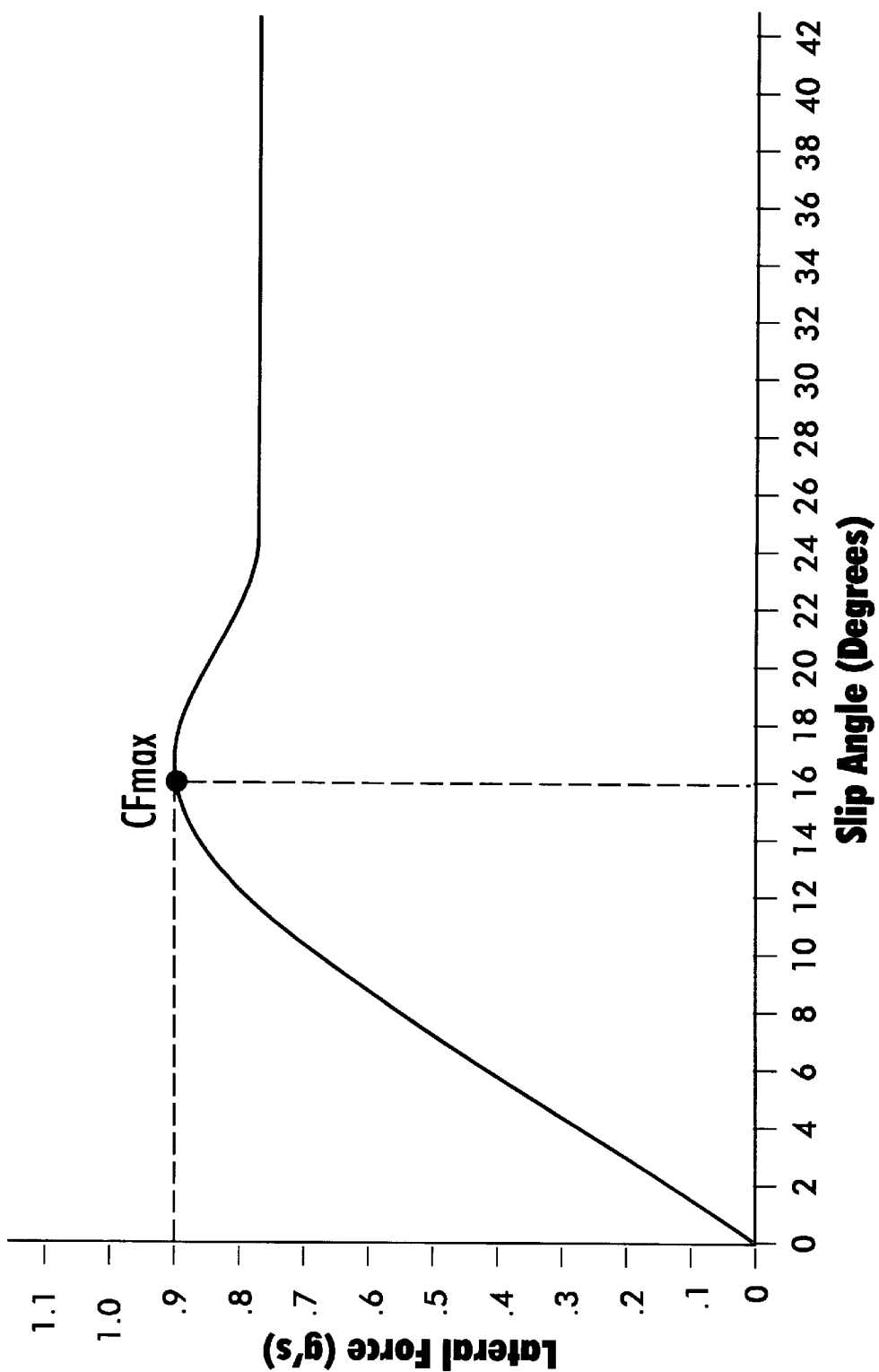
FIG. 3 is a representative tire curve showing CFmax or peak side force.

All tires have a maximum lateral force capability for any preselected vertical weight load. A relatively heavily loaded vehicle will decrease the tire's maximum cornering capability, because the tire's grip is opposing a relatively larger inertial mass that tends to continue in a straight line. A tire's maximum lateral force capability may be referred to as the "maximum cornering force" (CFmax). For a given vertical load, CFmax occurs at a specific slip angle. The graph of FIG. 3 shows a typical tire curve for a tire with a preselected vertical load. The graph shows CFmax as 0.9 G at a 16° slip angle. Beyond this value, the lateral force drops as the tire begins to lose grip with the pavement. Commonly a tire reaches its maximum cornering capacity for a given vertical load at a slip angle between 10° and 20°. At that angle, the tire no longer is capable of sustaining additional cornering forces and has become saturated.

Additional factors such as weather, road condition, road material, road design, tire tread design, rubber composition, tire inflation, tire wear, and vehicle weight distribution, by way of example and not limitation, can contribute to the tire traction in a specific situation. Tire manufacturers have been successful in providing tires with a high friction capacity, such that skidding or lateral slippage is an increasingly difficult result. However, with the availability and use of such excellent tires with high friction capacity, some vehicles, especially SUV vehicles, have entered an operating envelope in which the tire is likely to maintain traction even under conditions of lateral acceleration that will cause the vehicle to overturn. In these circumstances, it may be viewed that there is too much tire traction or too high a friction capacity. Rollover becomes a danger under any set of applied conditions where tire capacity exceeds the vehicle capacity. It would appear preferable in almost all situations to undergo lateral slippage or skidding in preference to a rollover. A rollover is one of the most dangerous possible events because all possibility of driver control or recovery is lost; while a slide allows the possibility that control will not be lost or will be recovered quickly.

Thus, this invention provides a system for decreasing tire traction under preselected conditions of anticipation or prediction of a rollover. The preferred method for decreasing tire traction is the application of a friction reducing substance to at least one of the tires of the vehicle, especially to the contact patch, and preferably to all of the tires on one lateral side of the vehicle.

The friction reducing substance may be viewed as a fluid material characterized by low resistance to flow and a tendency to assume the shape of its container. Hence, such a fluid substance may be a gas, a liquid, a solid, or any combination of liquids, solids, and gasses that achieve a reduction in traction between the tire and roadway when present at the tire/road interface. A preferred friction reducing substance is water or water-based, due to water's ready availability, generally safe nature, and ability to evaporate. A more preferred substance is alcohol or a mixture of alcohol and water, which shares many of water's favorable characteristics and, in addition, can be prepared in a mixture that tends to not freeze in typical cold weather conditions. Examples of suitable chosen alcohols are methanol, ethanol, isopropyl or combinations of these, all of which are readily available and of low cost. Alcohols and alcohol-water mixtures have been used as automotive antifreezes, fuel antifreezes, and automotive window washer fluid. Water and water-based solutions or mixtures may include additional components such as surfactants, detergents, or soaps. Often surfactant solutions can be prepared as a foam for application under either a gaseous pressure head or a pump.

Other suitable substances are glycols, glycol-water mixtures and glycol-alcohol mixtures. Glycols also are known for antifreeze usage and are readily available, although they may be costly and have less favorable overall characteristics. For example, glycols may tend to evaporate far more slowly than water or alcohol, and they also may tend to be far more slippery when deposited on a roadway. Thus, glycols are less desirable because they may cause problems for other cars on the road.

Solids can be used, such as in powders. Talc, graphite, and various other mineral structures, especially those that are formed in layers with slippage between them, have lubricity and can reduce friction between a tire and roadway. These have the advantage that they may tend to not freeze and not leak as readily as the preferred liquids. By contrast, a distinct disadvantage is that such solids effectively do not evaporate and, thus, may remain in place for a long time on a roadway where sprayed, creating a long term danger for other cars.

Solids or liquids are likely to include a gaseous component, such as an emulsifier or propellant. Dry air, carbon dioxide, or nitrogen are readily available, suitable propellants and may be used with either solids or liquids. For use with a liquid, an alternative to a pressurized propellant is a pump, although a pump may prove to be too slow acting as a direct propellant.

The fluid friction reducing substance also may function by creating a condition of lowered friction by acting on material characteristics at the tire/road interface. For example, the fluid may be low temperature gas such as liquid nitrogen, sprayed near or upon the tire to cause the deposit of condensed or frozen water vapor from ambient air. Similarly, a low temperature spray may strike a rubber tire to harden the rubber and thereby reduce friction between the tire and road.

A storage system and applicator are used with the friction reducing substance. A central storage system may consist of a first, closed, on-board tank or other reservoir containing the friction reducing substance. A tank may be pressurized under a pressure head of the propellant. Pressure may be supplied from a second tank or other reservoir containing the propellant or supplying propellant under desired pressure and joined to the first tank through a pressure regulator.

From the first tank, a delivery system such as a delivery orifice, nozzle, or supply line is arranged to feed the friction reducing substance to each of the four or more vehicle tires. Typically a supply line or conduit will be used to deliver the friction reducing substance to the most advantageous location. For example, near the tire, a supply line feeds the friction reducing substance to the proximity of the tire, preferably at the front edge of the tire or at the interface of the tire and the road. The goal is to reduce friction at the contact patch, which in most cases is best achieved by supplying the friction reducing substance in front of the tire, so that tire rotation will quickly result in the friction reducing substance being introduced to the contact patch. There, the friction reducing substance may function as a lubricant.

A supply line may be joined to a nozzle for dispersing the friction reducing substance over an area of selected width. Juxtaposed to the nozzle in the supply line is a valve that can be moved between active and inactive modes. The active mode may correspond to an open position, while the inactive mode may correspond to a closed position, respectively either feeding or not feeding the friction reducing substance through the nozzle. It is preferred that the valve be as close as possible to the nozzle so that the friction reducing substance will be supplied to the tire as quickly as possible when a rollover is imminent.

In a variation of the storage system, more than one on-board tank of the friction reducing substance can be used, each connected to the propellant tank through a pressure regulator. For example, a separate tank may serve each side of the vehicle, enabling a control system to activate either chosen side according to the direction of anticipated rollover. For example, it is only the wheels on the outside of a curved path that typically require treatment. More specifically, typically it is the front tire on the outside of a path that is most important to treat.

In another example, each wheel position may be served by a separate tank. The tanks may be modular and removable. For example, each tank can be an independent, disposable spray canister located in or near the wheel well. Such a system provides many advantages, including that the friction reducing fluid may be one that otherwise is not readily obtained or handled by the car owner. For example, it is possible that highly volatile liquids such as lower alcohols, ethers or ketones may be found useful, in which case the liquid may be best handled before use by keeping it sealed in a canister from the manufacturing plant. Alternatively, a replaceable spray canister may be readily removed for cleaning mud and debris from the nozzle, and such a canister can be replaced if a nozzle or valve is damaged. The actuator for such a modular canister might be a mechanical system such as a solenoid that activates a valve portion of the canister.

A control means or system including a vehicle condition sensor and processor detects vehicle condition, controls the valve or other actuator of the storage system, and opens the valve or otherwise activates the actuator when the sensor detects that rollover is imminent. In an unsophisticated system, a condition sensor can control a valve by an on/off signal from the sensor, itself. However, it is preferred that at least one processor receive data from one or more sensors and control one or more valves. In the alternative, a single sensor may control valves in groups or individually. For example, the sensor may open only those valves serving the tires on one side of the vehicle, such as on the outside of a curve. In another variation, more than one sensor may be used, for example with a different sensor serving a limited group of valves such as the valves on one side of a vehicle, or a different sensor may serve each valve or each wheel position.

The processor may be an electronic microprocessor, a computer, or logic controlled device capable of receiving vehicle condition data from sensors, processing it in accordance with an algorithm or computer coded instructions, and causing activation of a valve when a result of such processing predicts a preselected proximity to rollover conditions. If the processor is programmed sufficiently, it may be able to determine the likely direction of rollover, in which case a valve controlled by the processor can be selectively operated. For example, the processor may determine that, although a rollover is imminent, a selected valve will not be opened, while another valve will be opened.

As examples of useful data in predicting rollover, a processor may be operatively connected to or include suitable devices or means for measuring lateral acceleration, longitudinal acceleration, vehicle roll angle, vehicle roll rate, yaw angle, yaw rate, slip angle, vehicle speed, steering wheel angle, temperature, and steering wheel angle rate. The processor uses combinations of the data received from the sensors and coded instructions to predict or anticipate rollover danger. The determination of rollover danger must be made before the rollover takes place, in order to provide time for the traction reducing system to operate. Consequently, the processor will activate the system with a predetermined safety margin in the sensed data to provide time for system operation. For example, if a predetermined lateral force or other factor is equated to a rollover, the spray may be triggered if 50% of the predetermined factor is sensed, providing time for the spray system to operate before the vehicle encounters conditions sufficient to cause rollover. Variations in the characteristics of each brand or type of vehicle are likely to require empirical testing in order to determine what margin of safety is suitable. The safety margin is established by a threshold value for activation of the spray system.

With reference to FIG. 1, typical system components include a propellant tank 10 connected to a tank 12 carrying friction reducing fluid. The propellant tank may carry a pressure gauge 14 to allow inspection of its pressure charge. Tank pressure can be adjusted by using a fill valve for adding propellant from an external source. Alternatively, where the propellant is air, the propellant tank can be attached to an on-board compressor for automatic renewal of the air pressure charge. A pressure regulator 16 is operatively located between tanks 10 and 12, such as in a conduit 18.

A plurality of spray nozzles 20 are mounted to the vehicle, with one near each tire and aimed to spray on the tire or in front of the interface between the tire and the road. Thus, four spray nozzles 20 would meet the needs of most vehicles. An impending rollover involves a lifting or reduced weight on the tires on a first side of a vehicle, which correspondingly reduces the lateral force sustained by those tires. At the same time, weight shifts to the tires on the second, opposite side of the vehicle, correspondingly increasing the lateral force sustained by the tires on the second side. For these reasons, likely it will be necessary to spray friction reducing fluid only on the tires on the second side of a vehicle, on the outside of the turning curve. Thus, FIG. 1 shows a system having two nozzles, suited for the tires on a single side of a vehicle. A twin system may serve the second side, or the tank 12 may serve a twin set of nozzles positioned in the wheel wells on the second side. Each spray nozzle is controlled by a valve 22 that allows pressurized friction reducing fluid to flow from tank 12 and spray through the nozzle. Conduits 24 connect each valve 22 to the tank 12 for supplying fluid from the tank. The valve 22 is preferred to be close to the nozzle 20 so that pressurized fluid is immediately or quickly available to the nozzle when the valve opens. Additional lengths of conduit 24 may be used between the valves and nozzles as required or desired. In addition, a master solenoid valve 26 may control the outlet of the fluid tank 12 and be activated to open position when the vehicle ignition is turned on. The valves 22 are activated to open position by a processor that calculates rollover danger and sends an activating signal at a predetermined level of such danger.

Figure 2:
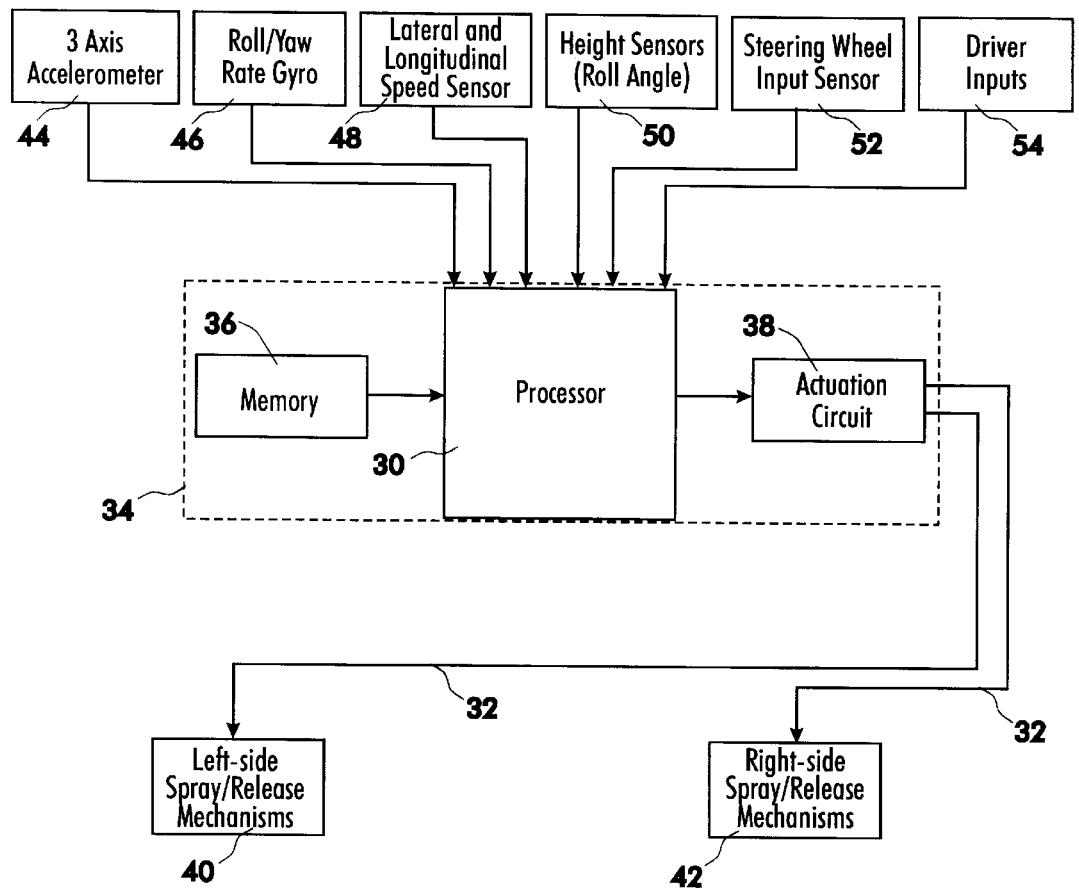
FIG. 2 is a block diagram showing a control system including a sensor and processor.

With reference to FIG. 2, a processor 30 provides overall control of the system by operative connection to the valves 22, such as through signal wires 32. The processor receives data from a plurality of sources and uses the data to calculate the danger of vehicle rollover. For example, the processor may receive data that enables it to calculate force vectors acting upon the vehicle. Whenever one or more predetermined limits are reached, the processor opens the valves 22 controlling appropriate nozzles 20. The data may be selected from many types, and the numerous known processors and software systems that presently activate rollover safety systems can be adapted to activate this rollover prevention system.

As an example of a suitable processor based actuator system, FIG. 2 shows processor 30 in a chip 34 containing stored parameters, formulas, and other useful code in memory module 36. The chip includes an actuation circuit 38 for sending suitable signals over signal wires 32 to the left side spray mechanisms 40 or the right side spray mechanisms 42, shown in more detail in FIG. 1. Certain data is sent to the processor as sensor inputs during vehicle operation. A three axis accelerometer 44 can measure lateral acceleration, longitudinal acceleration, and vertical acceleration. A high acceleration is a danger situation. A roll/yaw rate gyrometer 46 can measure the speed of vehicle roll or body lean and yaws, to measure potential oversteer. If either of these yaw rates is high, there is a danger situation. A lateral/longitudinal speed sensor 48 can measure both lateral and longitudinal vehicle speed. If the vehicle speed is low, the system can be automatically disabled, such as by closing the solenoid valve 26. The two types of speed data also are useful for vector analysis of the vehicle condition, such as by determining whether the vehicle is traveling sideways, which is a danger situation. Height sensors 50 are useful to determine roll angle relative to the ground plane. A high roll angle is a danger situation. A steering wheel input sensor 52, such as a potentiometer can measure steering wheel angles and steering wheel rates that the driver inputs. High angles and rates are danger situations. Additional manual inputs 54 may include weather information such as rain or wet road; road surface information such as gravel, paved, or icy; tire characteristics such as friction capacity; and desired margin of safety. Many relevant operating characteristics, types of data, and forces have been mentioned, which can be measured or sensed by numerous types of detectors, instruments, sensors, and devices, including those presently known or to be developed in the future. Those specifically mentioned above are offered by way of enabling example but are not to be taken as limitation.

From the various data and inputs, the processor can determine when the spray will be actuated. There is an expected lag between time of activating a spray and the time when reduced lateral friction is achieved. Hence, the system must function in an early warning capacity by predicting or anticipating when rollover might occur by comparing processor results with a threshold value and activating the spray in advance of the rollover reaching a critical or threshold stage of certainty. Hence, the processor will react to rollover predictive elements effecting the vehicle. Empirical testing of each design of vehicle is a recommended way of determining a suitable threshold value or margin of safety.

In operation, the sensors transmit their data to the processor, which employs a preset memory or threshold value to compare risk of rollover. Rollover thresholds can be predicted using combinations of data, which also serve as a safety measure that prevents or limits inappropriate activation of the spray nozzles. If rollover danger is sufficiently great, the processor sends a signal to the actuation circuit, which triggers the valves 22 on either the right side or left side of the vehicle, as determined to be appropriate. The nozzles 20 that are associated with the triggered valves 22 release a friction reducing agent onto the tire-to-road interface, thereby reducing friction and limiting the forces that the vehicle experiences to a level below the rollover threshold. With the tire friction capacity lowered, the vehicle has improved ability to slide sideways, and maintain a controllable or recoverable situation in preference to a rollover.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

What is claimed is:

1. An apparatus for reducing the danger of vehicle rollover under conditions of steering induced lateral force applied to a moving land vehicle having front and rear ends, at least a first pair of steerable, ground engaging tires located in a front position and a second pair of ground engaging tires located in a rear position, comprising:

a fluid capable of reducing traction of a ground engaging tire when the fluid is applied to the contact patch of the tire with the underlying ground;

a reservoir containing a volume of said fluid;

an applicator, selectively activatable between active and inactive modes, when in active mode delivering fluid from the reservoir to the proximity of the contact patch of at least one of the ground engaging tires;

control means for sensing a rollover predictive factor effecting the vehicle and activating the applicator to active mode in response to detection of at least a preselected value of the rollover predictive factor;

whereby the vehicle is enabled to dissipate the lateral force by sliding laterally.

2. The apparatus of claim 1, wherein said fluid is selected from the group consisting of water, alcohols, glycols, and combinations thereof.

3. The apparatus of claim 1, wherein said reservoir comprises:

a propellant tank containing a propellant gas under elevated pressure;

a fluid tank containing said fluid; and means connecting said propellant tank to said fluid tank for placing the fluid under pressure of said propellant gas.

4. The apparatus of claim 1, wherein said applicator comprises:

a valve selectively positionable between open and closed modes;

conduit means delivering fluid from said reservoir to said valve;

a nozzle connected to said valve, receiving fluid through the valve in open mode, and positioned on the vehicle in proximity to one of said vehicle tires.

5. The apparatus of claim 1, wherein said control means comprises an accelerometer measuring lateral acceleration.

6. The apparatus of claim 1, wherein said control means comprises a three axis accelerometer measuring lateral acceleration, longitudinal acceleration, and vertical acceleration.

7. The apparatus of claim 1, wherein said control means comprises a means for detecting vehicle roll rate.

8. The apparatus of claim 1, wherein said control means comprises a means for detecting vehicle yaw rate.

9. The apparatus of claim 1, wherein said control means comprises a speed sensor detecting lateral and longitudinal vehicle speed.

10. The apparatus of claim 1, wherein said control comprises height sensors detecting vehicle roll angle relative to the ground.

11. The apparatus of claim 1, wherein said vehicle is steered by a steering wheel, and said control means comprises a means for detecting steering wheel angles and steering rates.

12. The apparatus of claim 1, wherein said control means comprises:

a sensor detecting indications of a rollover predictive factor; and a processor receiving data from said sensor, comparing the data with a preselected threshold value, and activating said applicator when said preselected threshold value is reached.

13. A method for reducing the danger of vehicle rollover under application of a steering induced lateral force applied to a moving land vehicle having a front end, a rear end, a pair of steerable and laterally spaced apart front tires, and a pair of laterally spaced apart rear tires, comprising:

sensing a rollover predictive factor effecting the vehicle;

determining from said sensed factor that a predetermined threshold danger of overturn has been reached; and in response to said determination, applying to a tire contact patch of at least one of the vehicle tires a fluid capable of reducing ground traction of the tire;

whereby the vehicle is enabled to dissipate the steering induced lateral force by sliding laterally.

14. The method of claim 13, wherein:

said step of sensing the rollover predictive factor further comprises sensing an anticipated lateral direction of rollover; and said step of applying fluid further comprises applying fluid to a tire on the lateral side of the vehicle in the anticipated lateral direction of rollover.

15. The method of claim 14, wherein said step of applying fluid further comprises:

applying fluid to all tires on the lateral side of the vehicle in the anticipated lateral direction of rollover.

* * * * *